United States Patent [19]

Lendway

[11] Patent Number: 5,582,413
[45] Date of Patent: Dec. 10, 1996

[54] OIL SEAL FOR GAS TURBINE

[75] Inventor: Joseph K. Lendway, Woodruff, S.C.

[73] Assignee: General Electric Co., Schenectady, N.Y.

[21] Appl. No.: 474,775

[22] Filed: Jun. 7, 1995

Related U.S. Application Data

[62] Division of Ser. No. 249,484, May 26, 1994, Pat. No. 5,480,232.

[51] Int. Cl.⁶ ............................................. F16J 15/48
[52] U.S. Cl. ...................... 277/53; 277/70; 277/192
[58] Field of Search ............................. 277/53, 55, 57, 277/17, 18, 70, 71, 75, 77, 134, 192, 197, 199, 201, 215

[56] References Cited

U.S. PATENT DOCUMENTS

| | | |
|---|---|---|
| 1,890,839 | 12/1932 | Young ........................................ 277/53 |
| 2,543,615 | 2/1951 | Trumpler .................................. 277/53 |
| 3,788,652 | 1/1974 | Hirtz et al. .............................. 277/71 |
| 3,915,523 | 10/1975 | Shank . |
| 4,575,098 | 3/1986 | Escue ....................................... 277/197 |
| 4,722,616 | 2/1988 | Lederman . |
| 4,928,978 | 5/1990 | Shaffer et al. . |
| 5,009,522 | 4/1991 | Hahn . |
| 5,072,880 | 12/1991 | McCloud . |
| 5,190,440 | 3/1993 | Maier et al. ............................. 277/53 |
| 5,403,019 | 4/1995 | Marshall .................................. 277/53 |

FOREIGN PATENT DOCUMENTS

| | | | |
|---|---|---|---|
| 2364448 | 8/1974 | Germany ................................. 277/197 |
| 3904718 | 8/1990 | Germany ................................. 277/192 |
| 1583220 | 1/1981 | United Kingdom . |
| 2242944 | 10/1991 | United Kingdom . |

*Primary Examiner*—Daniel G. DePumpo
*Attorney, Agent, or Firm*—Nixon & Vanderhye

[57] ABSTRACT

In a rotor bearing housing comprised of split half sections (10) and adapted to be joined at horizontal joining surfaces (12) of the half sections, and wherein each half section includes a bearing recess flanked on either side thereof by a seal recess (16, 18); and a pair of annular bearing seals (24), each comprising a pair of half segments (26, 28), each segment adapted to be received in a respective seal recess in a split half sections of the housing, each segment having a pair of substantially horizontal interface surfaces (30, 32) at diametrically opposite sides thereof, the improvement comprising a groove (46) formed in each interface surface (30, 32), extending across a radial thickness dimension of the segment, such that opposing grooves in opposing interface surfaces combine to form a pair of oil channels in each annular bearing seal.

6 Claims, 3 Drawing Sheets

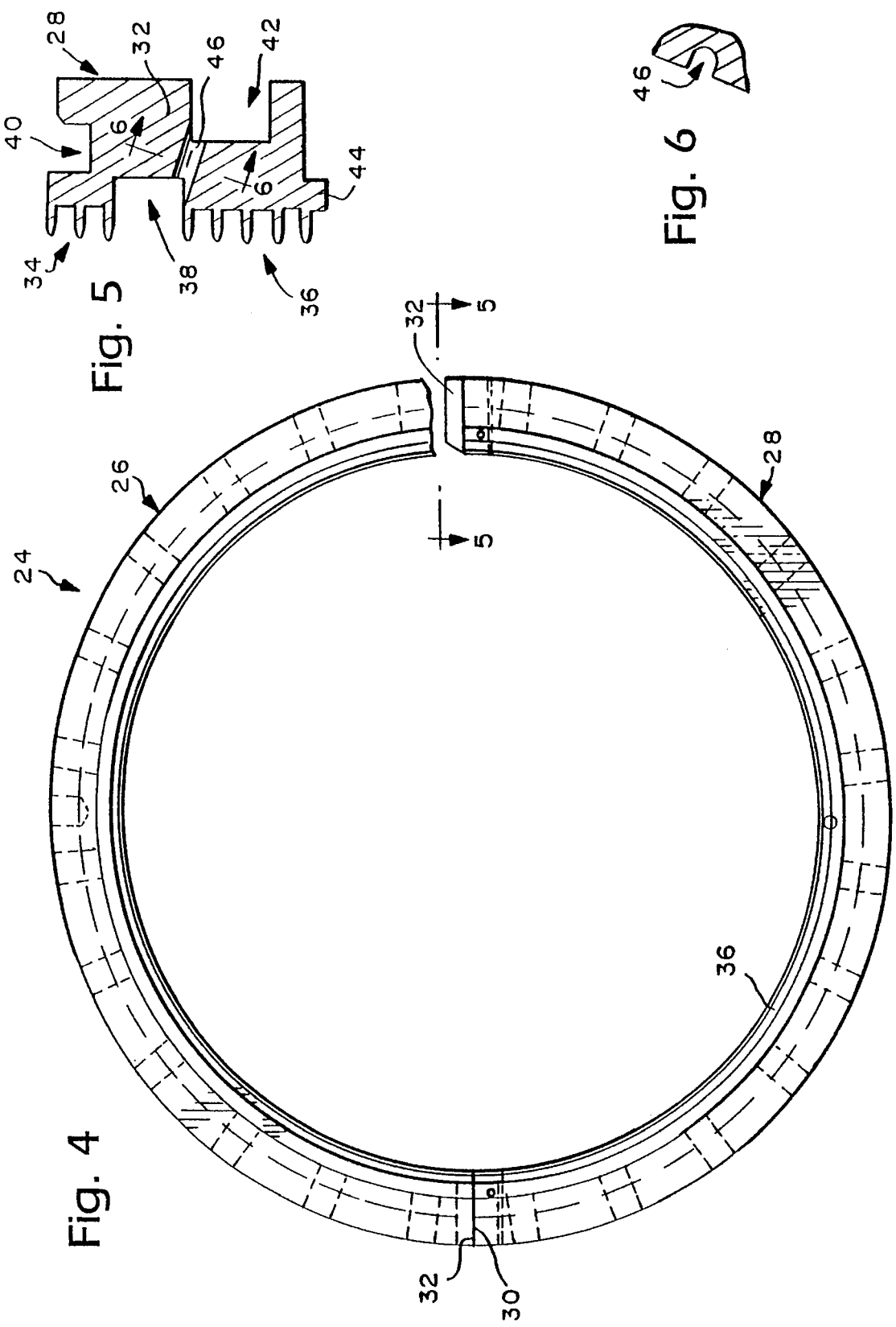

OIL SEAL FOR GAS TURBINE

This is a divisional of application Ser. No. 08/249,484 filed on May 26, 1994 now U.S. Pat. No. 5,480,232.

TECHNICAL FIELD

This invention relates to gas turbines in general, and to an improved oil seal design for a turbine bearing in particular.

BACKGROUND PRIOR ART

Main bearings supporting a gas turbine rotor at opposite ends of the turbine are prone to oil leakage, particularly at low speed on start-up and shut-down. These bearings are typically enclosed in split bearing housings which incorporate annular split bearing seals both fore and aft of the bearing itself. Large volumes of oil are fed to the bearings on start-up and during normal operation. Extraction air is used to pressurize the seals at operating speed and is effective to prevent oil leaks, but this air is not available during start-up and shut-down.

It has been attempted to solve the oil leak problem by forming grooves on opposite sides of one of the bearing housing half sections. These grooves were intended to more or less enclose the bearing itself and to prevent oil from creeping from the bearing through the horizontal joint along the mating surfaces of the housing half sections. Units tested after this modification nevertheless still exhibited oil leaks. It is a principal objective of this invention, therefore, to prevent oil leaks in gas turbine bearings and to prevent resulting costly tear-downs and shipment delays.

DISCLOSURE OF THE INVENTION

In an exemplary embodiment of the invention, the split bearing seals at both the fore and aft sides of the bearing itself each have been provided with aligned groove pairs at the horizontal joint interfaces between the seal half segments. In other words, the mating half segments of each seal (each extending 180°) have grooves at diametrically opposite sides of the segment such that each annular seal has four grooves which combine to form two oil channels. These grooves or channels are located axially between two groups of rotor sealing teeth and serve to channel any oil which leaks past the first group of rotor sealing teeth into a peripheral recess in the seal leading to a drain aperture in the bearing housing. The oil drains ultimately to a tank near the bearing housing where it is filtered, cooled, and recirculated to the bearing. This oil channeling function of the grooves in accordance with this invention is especially useful at low turbine speeds experienced at start-up and shut-down. The channels formed by the grooves serve an additional purpose, however, when the turbine is operating at speed. Because the bearing seals are pressurized, air under pressure will flow through the channels in a direction from the radially inner portion of the seal to the radially outer portion of the seal, thereby creating an air dam preventing oil from creeping across the horizontal seal interface, crossing the channels, and leaking out along the horizontal interface between the housing half sections.

As a result of this arrangement, oil leaks caused by the seals in the gas turbine bearing housings have been minimized if not substantially eliminated.

In its broader aspects, therefore, the present invention relates to an annular seal for a turbine rotor bearing housing comprising a pair of half segments, each segment extending substantially 180° and adapted to be received in a respective seal recess in a split half section of the housing, each segment having a pair of substantially horizontal interface surfaces at diametrically opposite sides thereof, each surface having a groove formed therein extending across a radial thickness dimension of the segment.

In another aspect, the invention relates to a rotor bearing housing comprised of split half sections and adapted to be joined at mating surfaces of the half sections, and wherein each half section includes a bearing recess flanked on either side thereof by a seal recess; and a pair of annular bearing seals, each comprising a pair of half segments, each segment adapted to be received in a respective seal recess in a split half section of the housing, each segment having a pair of substantially horizontal interface surfaces at diametrically opposite sides thereof, the improvement comprising a groove formed in each interface surface, extending across a radial thickness dimension of the segment, such that opposing grooves in opposing interface surfaces of a respective annular seal combine to form a pair of oil channels.

Other objects and advantages of the invention will become apparent from the detailed description which follows.

BRIEF DESCRIPTION OF THE DRAWINGS

FIG. 4 is an end view, partially cut away, of a bearing seal in accordance with the invention;

FIG. 5 is a detailed cross section of the bearing seal illustrated in FIG. 3; and FIG. 6 is a partial section taken along the line 5—5 in FIG. 4.

BEST MODE FOR CARRYING OUT THE INVENTION

Figure 1:
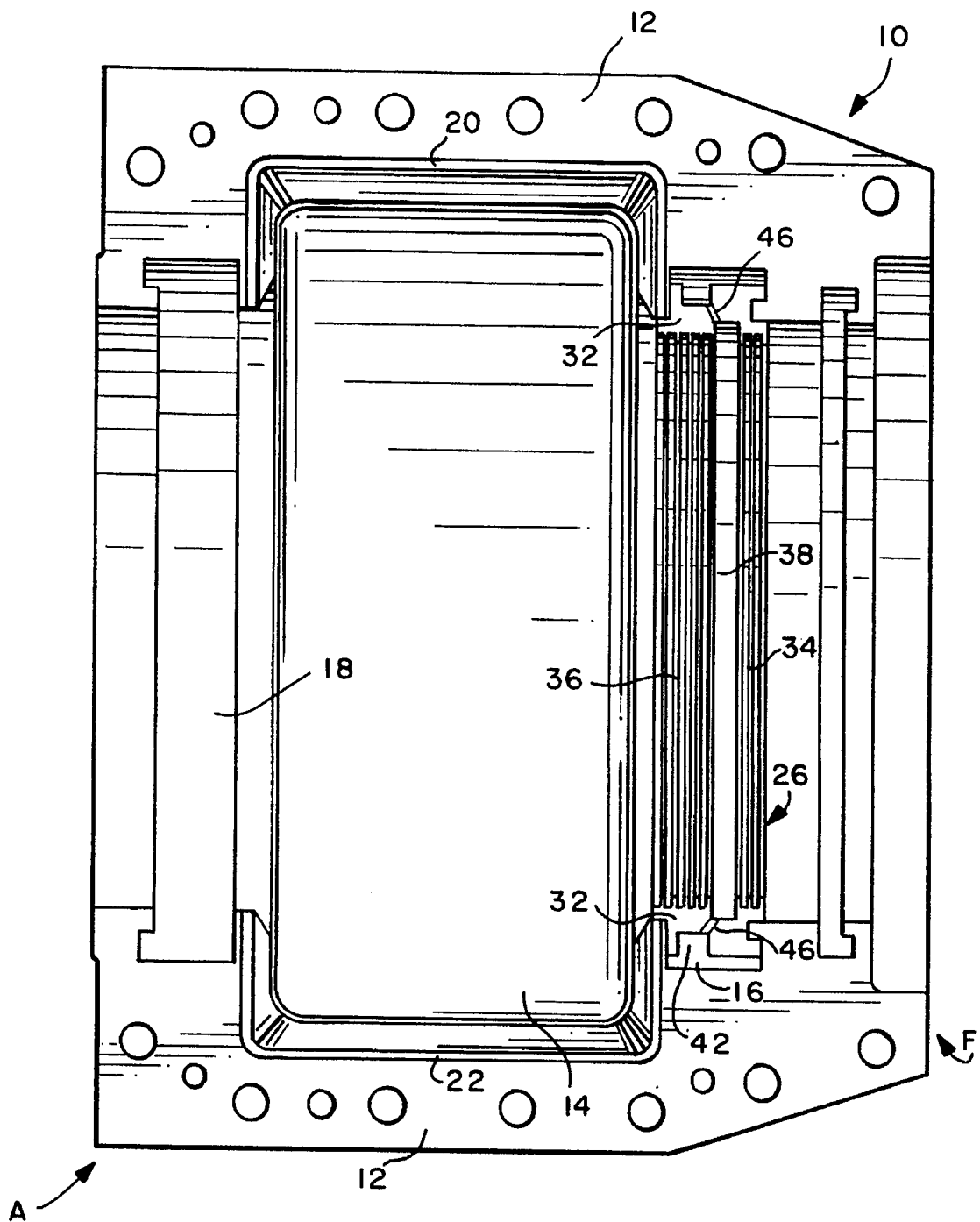
FIG. 1 is a plan view of a conventional bearing housing half section, incorporating a bearing seal in accordance with this invention.
Figure 2:
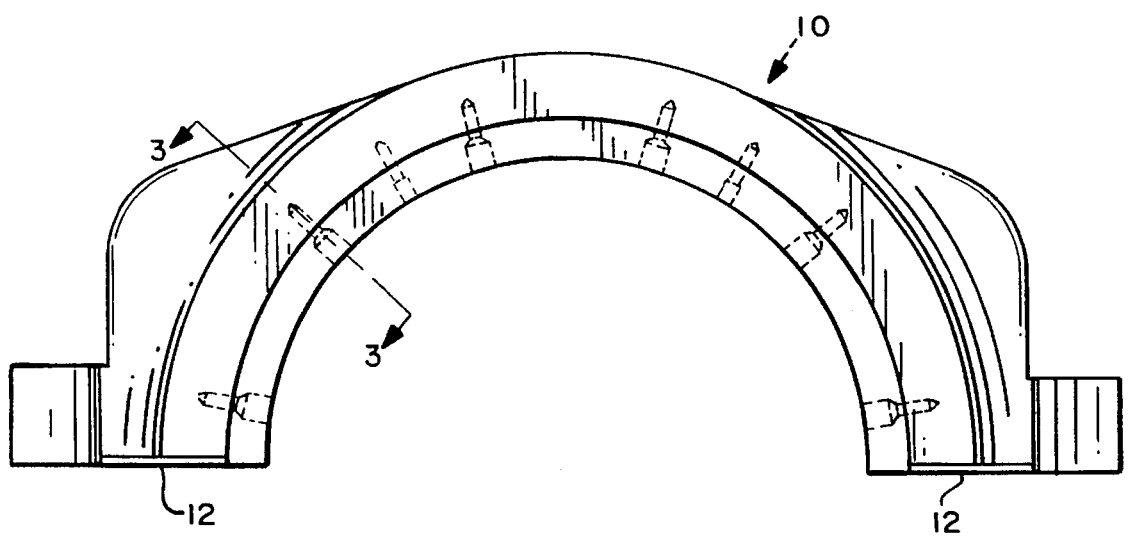
FIG. 2 is an inverted end view of the bearing housing half section illustrated in FIG. 1.
Figure 3:
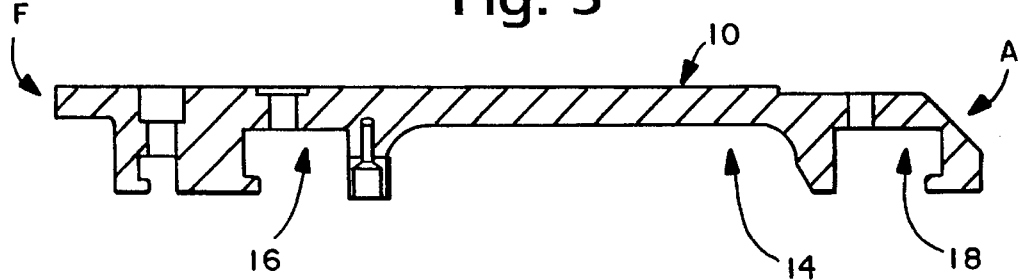
FIG. 3 is a section view taken along the line 3—3 in FIG. 2.

With reference to FIGS. 1–3, there is shown a bearing housing half section 10, and specifically, the interior of the upper half section of the bearing housing. This bearing housing half section 10 is designed for mating engagement with a similar lower bearing housing half section (not shown) which engages the flat horizontal interface surface 12 and which is secured thereto in a conventional manner, to thereby fully enclose an otherwise conventional bearing.

The housing half section 10 includes an enlarged centrally located bearing recess 14 flanked on the forward and aft ends F, A, respectively, by bearing seal recesses 16 and 18. FIG. 1 also illustrates the presence of grooves 20 and 22 formed on opposite sides of the bearing half section, partially enclosing the bearing receiving recess 14. These grooves formed part of an earlier attempt to solve the oil leakage problem based on the notion that it was the bearing itself which was leaking oil.

It was determined in accordance with this invention, that leakage at the bearing per se was not the problem but that, rather, leakage was occurring at the interface of the bearing seal half segments. More specifically, and with reference to FIGS. 4–6, the metal bearing seal 24 in accordance with this invention is also formed of upper and lower half segments 26, 28, respectively, which are adapted to be joined along horizontal interface surfaces 30 and 32. The seal construction is perhaps best understood with reference to FIG. 5, which illustrates in detail the cross sectional profile of the seal (which is only generally shown in FIG. 4). It will be understood that a mirror image seal (not shown) will be utilized at the aft end A of the housing 10, to be seated in recess 18 and like recess in the lower bearing housing half section. Only the seal 24 will be described here. Specifically, the lower seal section 28 on its radially inner side includes two groups of metal sealing teeth 34 and 36 which face radially inwardly, i.e., toward the rotor (not shown). These two groups of sealing teeth are separated by a radially inwardly facing recess 38 extending annularly throughout the entire half section of the seal.

The forward facing end of the seal includes a substantially U-shaped recess 40, while the right side or radially outer side of the seal includes a C-shaped recess 42, generally located radially adjacent the second group of sealing teeth 36. The aft side of the seal includes an axially projecting portion 44. Further reference to FIG. 1 indicates the manner in which the seal half section 26 is seated within the generally complementary shaped seal receiving recess 16 of the bearing housing section 10.

In accordance with this invention, an angled groove 46 is machined into the seal segment 28 and specifically within the horizontal joining surface 32 and extending from the radially inward recess 38 to the radially outward recess 42. A similar groove is formed on the opposite side of the seal half segment 28, and complementary paired grooves are also formed in the horizontal joining surfaces 30 of the seal lower half segment 26. In an exemplary embodiment, the groove 46 may have a depth of 0.118±0.020 inch and width of 0.094±0.010 inch. When the seal half segments 26, 28 are joined (as shown on the left hand side of FIG. 4) to form an annular seal, the paired grooves 46 form two oil channels on diametrically opposite sides of the seal 24, in the interface or joining surfaces 30, 32.

As already mentioned above, at low speeds such as experienced on start-up or shut-down, oil leaking past the first group of seal teeth 36 will flow into one or both channels formed by aligned pairs of grooves 46, and from there into the peripheral recess 42 which opens into the seal receiving recess 16 of the housing. The lowermost portion of the recess 42 communicates with a drain hole within the recess 16 which transfers oil from the bearing housing to a tank near the bearing, preferably on a base which also supports the adjacent end of the turbine. Here, the oil is filtered, cooled and recirculated to the bearing housing.

As also mentioned above, the bearing seals are pressurized at normal operating speeds such that pressurized air flows through the grooves 46 from the radially inner side of the seal to the radially outer side of the seal. This effectively creates an air dam across the seal, thereby preventing oil from migrating along the horizontal joining surfaces 30, 32, and jumping or passing across the paired grooves 46. In this way, any oil passing the first group of seal teeth 36 is prevented from escaping across the seal half segment interfaces, and then between the bearing housing half sections.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An annular seal for a bearing housing comprising a pair of segments, each segment adapted to be received in a respective seal recess in a split section of the housing, each segment having a pair of substantially planar interface surfaces at diametrically opposite sides thereof, each surface having a groove formed therein extending across a radial thickness dimension of the segment, wherein each segment has axially spaced sealing teeth facing radially inwardly, and further wherein said groove has one end located between said axially spaced sealing teeth.

2. The seal of claim 1 wherein each segment has a radially outwardly facing recess in an exterior peripheral surface thereof, and further wherein said groove has another end communicating with said radially outwardly facing recess.

3. The seal of claim 1 wherein said groove is about 0.188 inch deep and about 0.094 inch wide.

4. The seal of claim 1 wherein when said pair of segments are engaged, opposing grooves at each pair of substantially planar interface surfaces combine to form a channel.

5. The seal of claim 1 wherein said axially spaced sealing teeth are separated into two groups by a radially inwardly facing recess, and wherein said one end of said groove communicates with said radially inwardly facing recess.

6. The seal of claim 2 wherein said axially spaced sealing teeth are separated into two groups by a radially inwardly facing recess, and wherein said one end of said groove communicates with said radially inwardly facing recess.

* * * * *